May 16, 1939.  B. HOFFMANN  2,158,858
POWER PLANT APPARATUS FOR AIRCRAFT
Filed Jan. 11, 1937
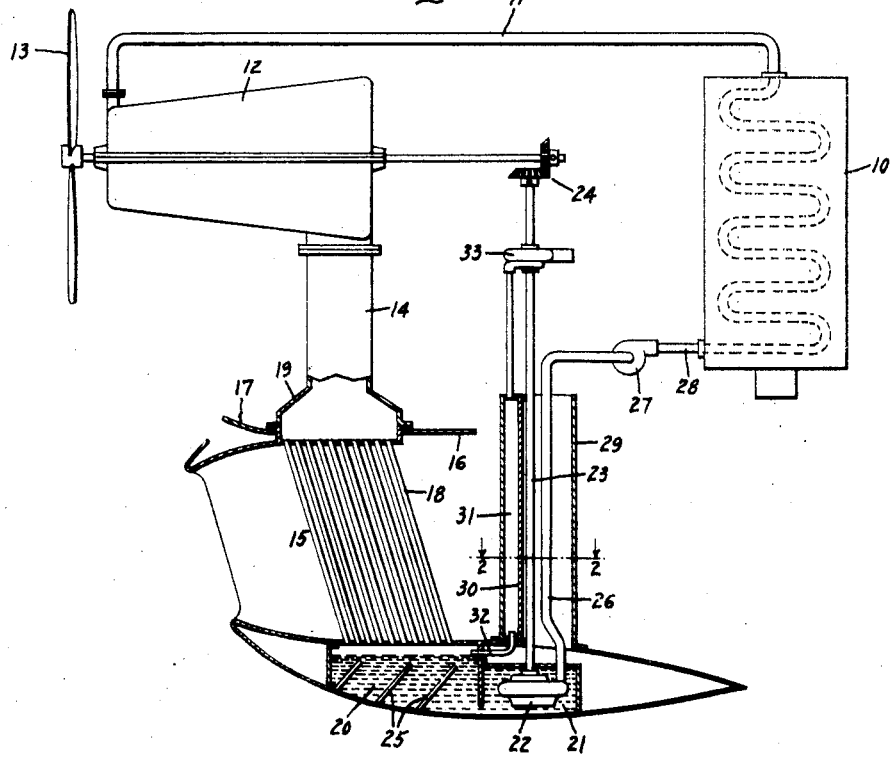
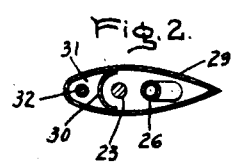
Inventor:
Bruno Hoffmann,
by Harry E. Dunham
His Attorney.

Patented May 16, 1939

2,158,858

UNITED STATES PATENT OFFICE 2,158,858

POWER PLANT APPARATUS FOR AIRCRAFT

Bruno Hoffmann, Berlin-Spandau, Germany, assignor to General Electric Company, a corporation of New York Application January 11, 1937, Serial No. 120,136
In Germany January 29, 1936

3 Claims. (Cl. 257—26)

The present invention relates to power plant apparatus for aircraft, more specifically to surface type condenser arrangements for such plants.

The object of my invention is to provide an improved construction and arrangement of air-cooled condensers and apparatus associated therewith for aircraft whereby exhaust fluid of turbines or like elastic fluid engines may be effectively condensed and the space for the condenser and other apparatus substantially reduced.

For a consideration of what I believe to be novel and my invention, attention is directed to the following description and the claims appended thereto.

In the drawing, Fig. 1 represents a somewhat diagrammatic view of an aircraft power plant embodying my invention, and Fig. 2 is a sectional view along line 2—2 of Fig. 1.

The elastic fluid power plant shown in the drawing comprises a boiler 10 for generating elastic fluid, such as steam. The boiler 10 is connected by a conduit 11 to the inlet of an elastic fluid engine, in the present instance indicated as a turbine 12 driving a propeller 13. The turbine 12 has a discharge conduit 14 connected to an air-cooled or radiator type condenser 15. The condenser is suspended from an aircraft and supported at its upper part by plates 16, 17 forming elements of an aircraft. The condenser has a plurality of cooling tubes 18 connected between an upper header 19 and a lower header 20. The lower header has a rearwardly extending portion 21 and is made considerably larger than is ordinarily necessary so that this lower header 20 with the rearwardly extending portion 21 defines at the same time a storage tank of a size sufficient to accommodate all the condensate, such as water, together with the entire amount of feed water to be carried by an aircraft. A condensate pump 22 is disposed in the rearward portion 21 and arranged so that it is at all times immersed in water or like operating medium in the lower header 20. The feed water pump has a shaft 23 driven from the main turbine shaft through bevel gears 24. A plurality of baffles 25 are arranged in the lower header 20 to dampen the motion of the water therein during operation of the aircraft.

The condensate pump 22 has a discharge conduit 26 which is connected to the inlet of a boiler feed pump 27; the latter has an outlet 28 connected to a heating element of the boiler 10. The shaft 23 and the discharge conduit 26 of the condensate pump 22 are surrounded by a streamlined casing 29. The front portion of the streamlined casing 29 includes a partition 30 which forms a channel 31. The lower end of the channel 31 communicates through a pipe 32 with the lower header and the upper end of the channel 31 is connected to the inlet of a pump 33 for removing air and other non-condensables from the condenser. The provision of the streamlined casing 29 reduces the air resistance during flight and at the same time protects the shaft 23 and the conduit 26. The lower header or water-storage tank 20 is also streamlined to reduce the air resistance during operation.

What I claim as new and desire to secure by Letters Patent of the United States, is:

1. In an elastic fluid power plant a condenser having an upper header and a lower header with a plurality of pipes connected therebetween, the lower header having a rearward extension and being of a size sufficient to accommodate the whole amount of feed water required during operation of an aircraft, and a pump disposed within the lower header.

2. In an elastic fluid power plant the combination of a condenser receiving exhaust from an engine and having an upper and a lower header with a plurality of pipes connected between them, the lower header being of a size sufficient to accommodate all feed water required during operation of the plant, and a condensate pump disposed within a lower portion of the lower header and normally completely immersed in operating liquid.

3. In an elastic fluid power plant for aircraft the combination of a condenser having upper and lower headers with a plurality of tubes connected between them, the lower header having a rearward extension and being streamlined, a condensate pump disposed in the rearward extension and arranged normally to be completely immersed in operating liquid, a drive shaft for the condensate pump, a streamlined casing surrounding the drive shaft and the discharge conduit of the condensate pump, and a partition in the casing defining a channel for receiving non-condensables from the lower header.

BRUNO HOFFMANN.